United States Patent [19]

Fischer

[11] Patent Number: 4,831,788

[45] Date of Patent: May 23, 1989

[54] METHOD AND DEVICE FOR CONTROLLING THE ROLLING DRIVE OF A GEAR GRINDING MACHINE

[75] Inventor: Heinrich R. Fischer, Munich, Fed. Rep. of Germany

[73] Assignee: Carl Hurth Maschinen- und Zahnradfabrik GmbH & Co., Munich, Fed. Rep. of Germany

[21] Appl. No.: 196,130

[22] Filed: May 19, 1988

[30] Foreign Application Priority Data

May 21, 1987 [DE] Fed. Rep. of Germany ....... 3717078

[51] Int. Cl.$^4$ ............................................. B24B 19/00
[52] U.S. Cl. .................................. 51/287; 51/123 G; 51/165.76
[58] Field of Search ...... 51/95 G H, 105 GG, 123 G, 51/124 R, 165.76, 287

[56] References Cited

U.S. PATENT DOCUMENTS

| | | | |
|---|---|---|---|
| 4,512,109 | 4/1985 | Van de Locht | 51/123 G |
| 4,739,587 | 4/1988 | Erhardt | 51/123 G |

*Primary Examiner*—Robert P. Olszewski
*Attorney, Agent, or Firm*—Flynn, Thiel, Boutell & Tanis

[57] ABSTRACT

A method and apparatus for the rolling drive of a gear grinding machine. The rotation portion of the rolling movement of the workpiece is effected by roll bands, which at one end are secured to a roll-band carriage movable back and forth with respect to the workpiece axis and at the other end are secured to a roll cam and roll onto and off therefrom. The roll cam and the workpiece are supported on a roll-cam carriage movable back and forth parallel to the roll-band carriage. The roll-band carriage and the roll-cam carriage can be driven at a substantially phase-equal movement. The relationship between the stroke of the roll-band carriage and the roll-cam carriage can be adjusted corresponding with the difference between the diameter of the roll cam and of the workpiece. To control the drive of the roll-band carriage, on the one hand the path covered above ground by the roll-cam carriage and on the other hand the distance between the roll-cam carriage and the roll-band carriage is determined in intervals, the relationship between these two values is calculated and is compared with a desired value corresponding with the adjusted stroke relationship, and the drive of the roll-band carriage is corrected corresponding with a determined deviation.

5 Claims, 2 Drawing Sheets

METHOD AND DEVICE FOR CONTROLLING THE ROLLING DRIVE OF A GEAR GRINDING MACHINE

FIELD OF THE INVENTION

The invention relates to a method and apparatus for controlling the rolling drive of a gear grinding machine for use in machining of tooth flanks of gears.

BACKGROUND OF THE INVENTION

The rotation portion of the rolling movement must be changed in a gear grinding machine when gears with differing diameter are manufactured. It is known for this purpose to also exchange the roll cam with a change in the diameter of the workpiece. Such an operation, however, requires a considerable amount of change-over time.

Rolling drives are known from German Patentschrift No. 7 21 899, German Offenlegungsschrift No. 27 01 204 and U.S. Pat. Nos. 3,263,372, 4,045,916 and 4,045,917. A method and apparatus for steplessly adjusting a rolling drive is already known from German Pat. No. 35 15 913, which corresponds to U.S. Pat. No. 4,739,587. The driven roll-cam carriage and the roll-band carriage are connected through joints with a rocker arm which is hinged to a part on the machine frame, which part can be adjusted in correspondence with the workpiece diameter to transmit the movement of the roll-cam carriage onto the roll-band carriage. As practice has shown, this known roll drive is, due to its kinematics, not very rigid and therefore less suited for machining of precision gears.

The basic purpose of the invention is to further develop the methodology and apparatus of this type so that a better synchronization of the translatoric movements of the roll-cam carriage and of the roll-band carriage results to bring about a precisely defined rolling movement of the roll cam.

As will yet be discussed in greater detail in connection with the description of a preferred exemplary embodiment of the invention, it is necessary during the machining of a gear, the diameter of which is larger than the diameter of the roll cam, to cause a movement of the roll-band carriage to coincide with the movement of the roll-cam carriage. This means that the speed of the roll-band carriage relative to the roll-cam carriage is always less than relative to the machine frame. Thus the movement of the roll-band carriage relative to the roll-cam carriage, that is the distance between the two carriages, can be measured substantially more exactly with an electric measuring device than the path covered by the roll-band carriage with respect to the machine frame. Since the measured values determined by a measuring device are processed in a calculator, it must also be considered that the frequency of the measuring impulses has a natural limit caused by the efficiency of the calculator. A measuring of the distance between the two carriages is also for this reason substantially more advantageous than a measuring of the path covered by the roll-band carriage with respect to the machine frame. Also errors in measurement are avoided by the inventive method, which errors result from length changes of the machine frame due to temperature variations.

BRIEF DESCRIPTION OF THE DRAWINGS

One exemplary embodiment of the invention is illustrated in the drawings and will be discussed in greater detail hereinbelow.

In the drawings.

DETAILED DESCRIPTION

Figure 1:
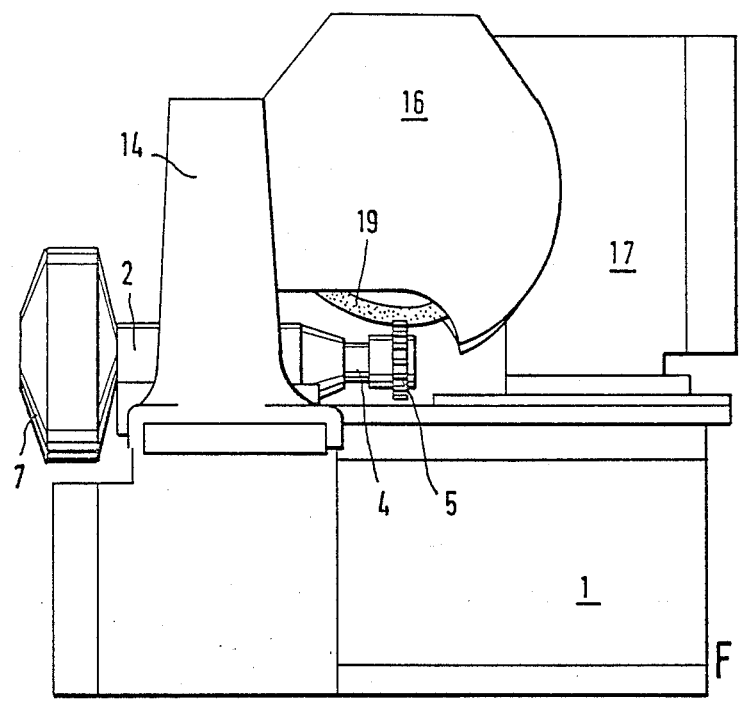
FIG. 1 schematically illustrates a gear grinding machine embodying the invention.
Figure 2:
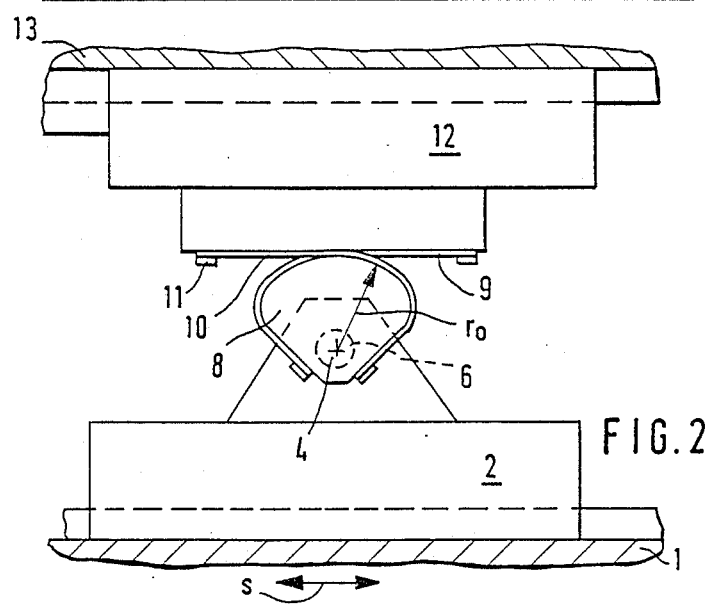
FIG. 2 is an enlarged cross-sectional view of an area of the machine according to FIG. 1.
Figure 3:
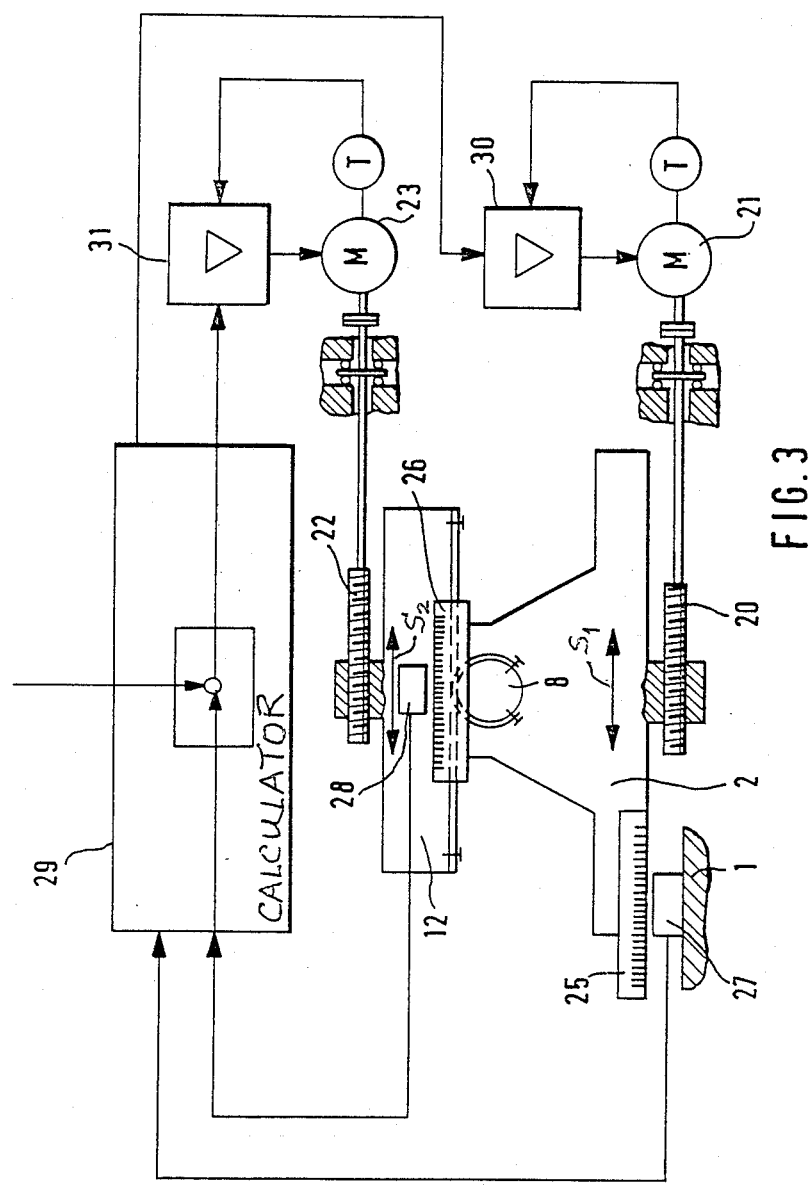
FIG. 3 is an illustration similar to FIG. 2, in which the control of the drive of the roll-band carriage in dependency of the drive of the roll-cam carriage is schematically illustrated.

A roll-cam carriage 2 is supported and driven for back and forth movement perpendicularly with respect to the drawing plane of FIG. 1 in a suitable guideway on a machine base 1 of a gear grinding machine. The drive means for effecting the back and forth movement are illustrated in FIGS. 2 and 3 and will be described in greater detail hereinbelow. A workpiece spindle 4, which is known and is therefore not illustrated in detail, is supported for transverse movement with respect to the direction of movement of the roll-cam carriage 2. A roll-cam sleeve 6 envelopes the workpiece spindle 4 at its end remote from the workpiece 5. The workpiece spindle 4 is together with the roll-cam sleeve 6 arranged movably back and forth transversely with respect to the axis of the workpiece spindle, however, they are not longitudinally movable parallel to their axis. The workpiece 5 and a grinding disk 19 thus carry out exclusively a relative movement to effect a plunge feed in direction of the depth of the tooth. The workpiece spindle 4 and the roll-cam sleeve 6 are coupled at the end remote from the workpiece with a conventional indexing-control mechanism 7, of which only the housing is shown in FIG. 1. The roll-cam sleeve 6 and the workpiece spindle 4 can be supported in the same bearings. The workpiece 5, which is a gear or the like, for example a shaving gear or a master gear, which is to be precision ground, can be clamped or chucked at the end of the workpiece spindle 4 remote from the indexing-control mechanism 7. A roll cam 8 is clamped, if desired exchangeably and adjustably relative to the roll-cam sleeve 6, on the roll-cam sleeve 6. Roll bands 9, 10 are secured at one end to the roll cam 8 and at their other ends to a roll-band carriage in a suitable manner as by screws 11. The roll-band carriage 12 is supported for movement transversely with respect to the axis of the workpiece spindle 4 on an arm 13 in a suitable guideway, which is not illustrated in detail. The arm 13 is secured to a column 14, which in turn is secured to the machine base 1. The grinding disk 19, which for machining of a workpiece tooth flank, is receivable into a tooth gap of the workpiece 5, is arranged elevationally adjustably in a grinding-wheel spindle head 16, which in turn is connected to a grinder stand 17. By changing the inclination of the grinding disk 19, its pressure angle with the workpiece teeth can be adjusted. The grinder stand 17 can in turn be adjusted on the column 1 to the desired pitch angle of the workpiece teeth.

The drive which is used for the parallel movement of the roll-cam carriage 2 and of the roll-band carriage 12 is illustrated in FIG. 3. The roll-cam carriage 2 is threadedly coupled to a threaded spindle 20 which, in turn, is coupled with an electric servomotor 21. The roll-band carriage 12 is threadedly coupled in a similar manner to a threaded spindle 22 which, in turn, is coupled with an electric servomotor 23.

The following discussion is based on the roll-cam carriage 2 being driven through the threaded spindle 20 by the servomotor 21 to carry out a back and forth movement with a stroke $s_1$, whereas the roll-band carriage 12 remains stationary relative to the machine base 1. While the roll-cam carriage 2 carries out the stroke $s_1$, the roll cam 8 rolls along the stationary roll-band carriage 12. The angle of rotation of the roll cam 8 having a radius $r_0$ is thereby determined by the following equation:

$$\alpha_0 = \frac{s_1 \cdot 180}{r_0 \cdot \pi} \ [°]$$

if one would now replace the roll cam, to adapt to a workpiece having a diameter, with another roll cam having a radius $r_1$, then the following angle of rotation of the roll cam would result:

$$\alpha_1 = \frac{s_1 \cdot 180}{r_1 \cdot \pi} \ [°]$$

In order to achieve with the roll cam 8 having a radius $r_0$ the same angle of rotation $\alpha_1$ as with a roll cam having a radius $r_1$, it is necessary to superpose the roll cam 8 with an additional rotary movement, which is done by a suitable translatoric movement of the roll-band carriage 12 having a stroke $s_2$. The following equation is valid for the superposed rotary movement of the roll cam 8:

$$\Delta \alpha = \alpha_0 - \alpha_1 = \frac{s_2 \cdot 180}{r_0 \cdot \pi} \ [°]$$

stated differently:

$$\frac{s_1 \cdot 180}{r_0 \cdot \pi} - \frac{s_1 \cdot 180}{r_1 \cdot \pi} = \frac{s_2 \cdot 180}{r_0 \cdot \pi}$$

or:

$$s_1 - \frac{s_1 \cdot r_0}{r_1} = s_2$$

from this results:

$$s_1 - s_2 = \Delta s = \frac{s_1 \cdot r_0}{r_1}$$

The above equation states that the distance between the roll-cam carriage 2 and the roll-band carriage 12 corresponds with the path covered by the roll-cam carriage 2, when the radius of the machined workpiece corresponds with the radius of the roll cam 8. The roll-band carriage 12 remains in this case stationary relative to the machine base 1. However, the distance between the two carriages 2 and 12 relative to the path covered by the roll-cam carriage 2 with respect to the machine base 1 decreases with an increasing radius of the workpiece relative to the radius of the roll cam 8. Care must be taken to assure that the above equation not only meets at the two end points of the movement of the roll-cam carriage, but also at any desired in-between position. In order for this condition to be met, an electronic data-processing system is associated with the gear grinding machine.

According to FIG. 3, a first scale 25 is secured to the roll-cam carriage 2. The scale extends parallel to the direction of movement of the roll-cam carriage 2. A photo-electric sensor 27 is secured to the machine base 1 and is associated with the scale 25. A second scale 26 is furthermore secured to the roll-cam carriage 2 and extends parallel to the direction of movement of the roll-cam carriage and lies in a plane tangent with the roll cam 8. A second photo-electric sensor 28 secured on the roll-band carriage 12 is asssociated with the second scale 26. The first photo-electric sensor 27 determines in this arrangement the actual position value of the roll-cam carriage 2 relative to the machine base 1 by counting the path increments covered by the roll-cam carriage 2. The second photo-electric sensor 28, on the other hand, determines the actual position value of the roll-band carriage 12 relative to the roll-cam carriage 2 by counting the path increments covered compared with the second scale 26. The measured signals of the two photo-electric sensors 27 and 28 are fed into a calculator 29. The calculator can be programmed by supplying an external desired value. In this desired value is considered, on the one hand, the stroke and the desired speed of the roll-cam carriage 2, so that the servomotor 21 driving the roll-cam carriage 2 operates at the suitable speed. The calculator 29 delivers a suitable signal for this purpose to a control device 30 associated with the servomotor 21. The above-mentioned external desired value also considers the radius of the workpiece 5 to be machined, so that the condition $$\frac{\Delta s}{s_1} = \frac{r_0}{r_1}$$

has been met. The calculator 29 sends furthermore a signal to a control device 31 associated with the servomotor 23.

As shown in FIG. 3, a separate position control device 30,31 is associated with the servomotor 21 driving the roll-cam carriage 2 and the servomotor 23 driving the roll-band carriage 12. The difference between the actual and desired relative position between the roll-band carriage 12 and the roll-cam carriage 2 is used thereby as a command variable for controlling the position of the roll-band carriage 12. This arrangement assures that the roll-band carriage 12 is driven in dependency of the movement of the roll-cam carriage 2 by the associated servomotor 23 such that the roll cam 8 is superposed by an additional rotary movement which is needed for balancing the difference between the radius $r_0$ of the existing roll cam 8 and the radius $r_1$ of the workpiece to be machined.

During the operation of the gear grinding machine, care must be taken that the radius $r_0$ of the utilized roll cam 8 is not larger than the radius $r_1$ of the workpiece 5 to be machined, so that the roll-cam carriage 2 and the roll-band carriage 12 are not driven in opposite directions. Namely, the achievable machining precision becomes greater with a decrease of the relative speed between the two carriages 2 and 12. At a pregiven impulse frequency of the photo-electric sensor secured on the roll-band carriage 12, the detected path increments become smaller with a decrease of the speed of the sensor 28 relative to the second scale 26 secured on the roll-cam carriage 2.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for controlling the rolling drive of a gear grinding machine for the machining of the tooth flanks of straight or helically toothed spur gears, in which the rotation portion of the rolling movement of the workpiece is effected by roll bands secured at a first end to a roll-band carriage movable back and forth transversely with respect to the workpiece axis and at a second end to a roll cam and adapted to roll onto and off therefrom, with the roll cam and the workpiece being supported on a roll-cam carriage movable back and forth parallel to the roll-band carriage, and in which the roll-band carriage and the roll-cam carriage can be driven at a substantially phase-equal movement, with the relationship between the stroke of the roll-band carriage and the roll-cam carriage being adjustable corresponding with the difference between the diameter of the roll cam and of the workpiece, the improvement comprising controlling the drive of the roll-band carriage in intervals, wherein the path covered relative to a machine frame by the roll-cam carriage, is determined by a first electric measuring device and the actual position of the roll-band carriage relative to the roll-cam carriage, is determined by a second electric measuring device, wherein the relationship between signals from these two measuring devices is calculated and compared with a desired value corresponding with the adjusted stroke relationship, and wherein the distance of the roll-band carriage is corrected corresponding with a determined deviation difference.

2. In an apparatus for controlling the rolling drive of a gear grinding machine for the machining of the tooth flanks of straight or helically toothed spur gears, in which the rotation portion of the rolling movement of the workpiece is effected by roll bands secured at a first end to a roll-band carriage movable back and forth transversely with respect to the workpiece axis and at a second end to a roll cam and adapted to roll onto and off therefrom, with the roll cam and the workpiece being supported on a roll-cam carriage movable back and forth parallel to the roll-band carriage, and in which the roll-band carriage and the roll-cam carriage can be driven at a substantially phase-equal movement, with the relationship between the stroke of the roll-band carriage and the roll-cam carriage being adjustable corresponding with the difference between the diameter of the roll cam and of the workpiece wherein a machine frame is provided, wherein means are provided for movably supporting each of the roll-cam carriage and the roll-band carriage, and wherein a servomotor is provided for facilitating an approximate phase-equal back and forth movement of the two carriages with an adjustable stroke relationship, the improvement wherein a one of said servomotors is associated with each of the roll-cam carriage and the roll-band carriage, wherein a first electric measuring device is provided for determining the path covered by the roll-cam carriage relative to the machine frame, wherein a second electric measuring device is provided for determining the actual position of the roll-band carriage relative to the roll-cam carriage, and wherein a calculator is provided for processing the signals emitted in intervals by the two measuring devices in order to control the servomotor associated with the roll-band carriage to maintain an adjusted relationship between the movements of the two carriages.

3. The device according to claim 2, wherein the first electric measuring device consists of a first scale arranged on the roll-cam carriage parallel to its direction of movement and of a photocell arranged opposite the scale on the machine frame.

4. The device according to claim 3, wherein the second electric measuring device consists of a second scale arranged on the roll-cam carriage parallel to its direction of movement and of a photocell arranged opposite the scale on the roll-band carriage.

5. The device according to claim 4, wherein the second scale arranged on the roll-cam carriage lies in a plane tangent with the roll cam.

* * * * *